May 3, 1927.
R. E. NEILSON
SAFETY HOOK
Filed Oct. 30, 1926
1,626,866
2 Sheets-Sheet 2
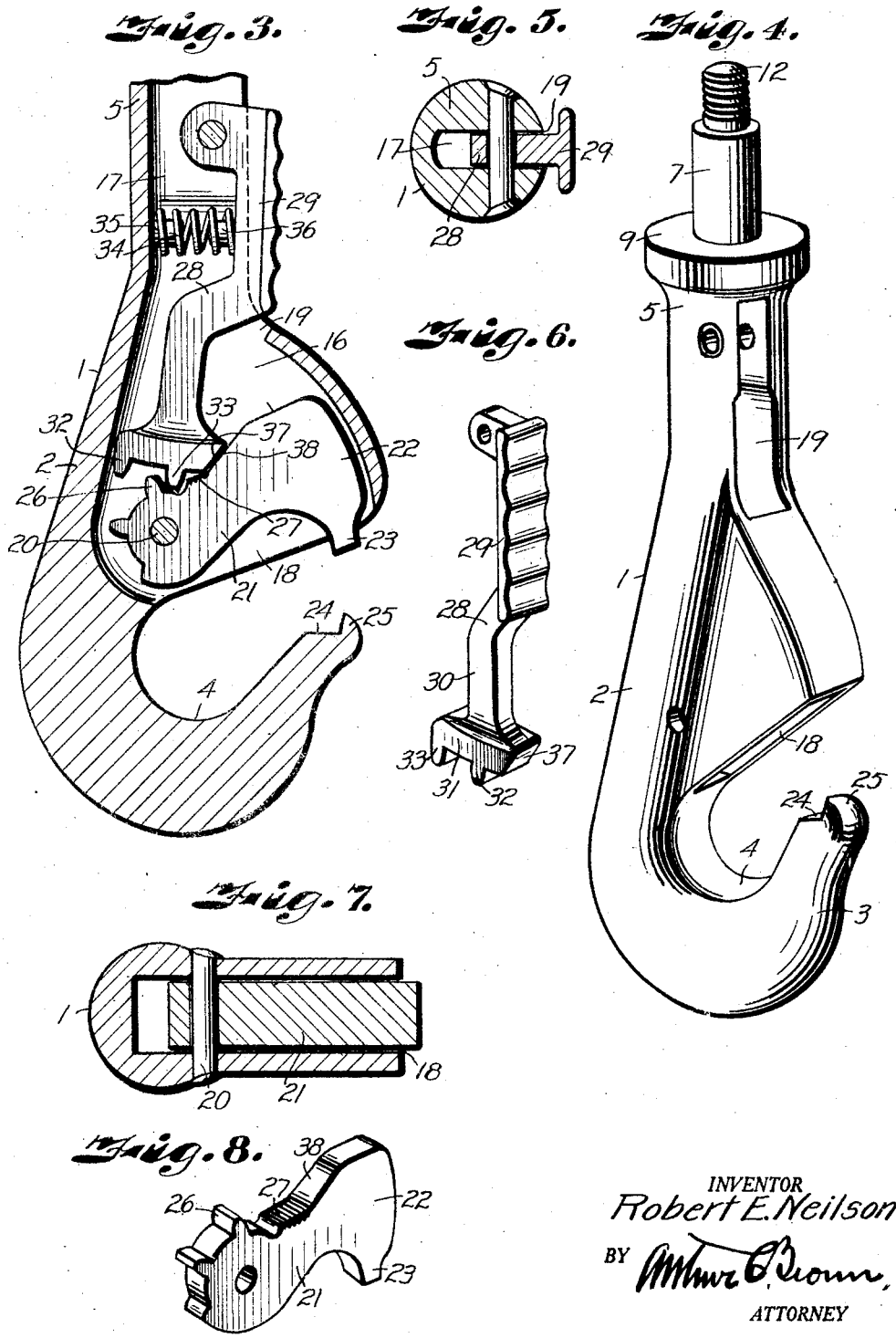
INVENTOR
Robert E. Neilson
BY Arthur C. Brown,
ATTORNEY Patented May 3, 1927.

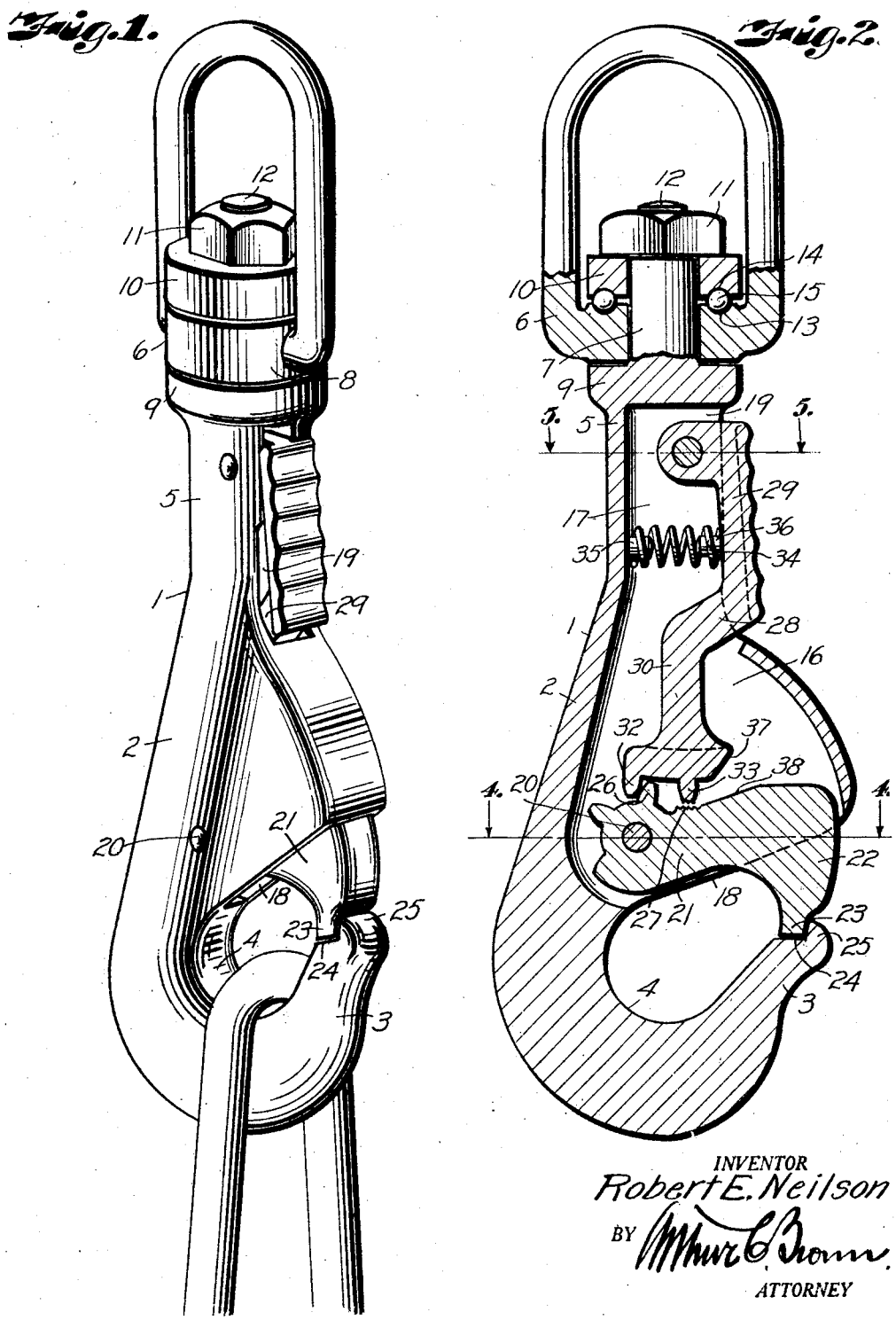

1,626,866

UNITED STATES PATENT OFFICE.

ROBERT E. NEILSON, OF TULSA, OKLAHOMA.

SAFETY HOOK.

Application filed October 30, 1926. Serial No. 145,202.

My invention relates to safety hooks and more particularly to a device of that character for use in connection with oil well derricks or like structures wherein heavy articles such as well casing, tubing or rods, buckets or the like are raised and lowered by means of bails which are intermittently applied to and removed from the hook; a principal object of the present invention being to provide a hook of this character with a latching mechanism which may be locked to prevent its accidental displacement and thereby avoid accidents resulting from escape of the bail from the hook.

In accomplishing this object I have provided improved details of structure, the preferred forms of which are illustrated in the accompanying drawings wherein:

Fig. 1 is a perspective view of a safety hook embodying my invention.

Fig. 2 is a longitudinal sectional view of the hook, particularly illustrating the trigger and latch elements.

Fig. 3 is a similar view showing the elements as they appear when the latch is open.

Fig. 4 is a detail perspective view of the hook body prior to assembly of the trigger and latch elements.

Fig. 5 is a cross section on the line 5—5, Fig. 2.

Fig. 6 is a detail perspective view of the trigger.

Fig. 7 is a cross section on the line 7—7, Fig. 2.

Fig. 8 is a detail perspective view of the latch.

Referring more in detail to the drawings. 1 designates the hook body preferably constructed of cast steel and comprising a housing 2 having a bill 3 at one end forming the bail socket 4 and having a shank 5 at its other end provided with a clevis 6 whereby the hook may be suspended from an operating cable. In order to provide free swiveling movement of the hook from its support, I form a pintle 7 on the shank upon which the clevis hub 8 is pivotally mounted between a collar 9 formed integrally with the hook shank and a collar 10 on the pintle, the collar 10 being retained on the pintle by a nut 11 threaded onto a bolt end 12 on the pintle. The hub 8 and the collar 10 are provided with ball races 13—14 for carrying the anti-friction balls 15 that insure free swiveling movement for the elements.

The housing 2 and shank 5 are provided with communication chambers 16 and 17, the chamber 16 having a mouth 18 opening to the socket 4 and the chamber 17 having a mouth 19 for a purpose presently set forth.

Pivotally mounted on a pin 20 within the lower, rear corner of the housing chamber 16 is a latch 21 having a head 22 provided with a tooth 23, the head being adapted for projection through the mouth of the housing chamber and the tooth for seating in a shouldered recess 24 in the tip of the bill. With this arrangement the latch moves by gravity to close the socket and seat the tooth 23 back of the tooth 25 in the bill so that the tooth 25 acts as a stop against which outward thrusts of a bail seated in the socket may be absorbed and thereby avoid breakage of the latch. The mounting portion of the latch is provided with radial gear teeth 26, and the upper edge of the latch adjacent the hub with a stop portion 27.

Pivotally mounted within the shank chamber 19 is a trigger 28, comprising a handle portion 29 which extends through the mouth 19 of the shank chamber so that it is exposed for operation, and an actuating shank 30 off-set from the handle portion and provided with an arcuate head 31 having spaced gear teeth 32—33 meshing with the gear teeth 26 of the latch arm. The gear teeth 32—33 on the trigger are spaced to provide lost motion relative to the latch teeth, and the trigger is yieldingly urged outwardly by a spring 34 to tension the trigger tooth 32 against the latch tooth to insure closure of the latch.

The spring 34 is preferably a compression spring having its ends anchored to pins 35 and 36 on the body shank and trigger handle respectively. When the parts are in normal position, i. e., when the latch is closed, the trigger tooth 33 overlies the stop portion 27 on the latch and serves as a detent to prevent accidental displacement of the latch from its closed position. The actuator shank is also provided at its lower front corner with an inclined face 37 adapted for engagement by a stop face 38 on the upper edge of the latch to limit opening travel of the latch as illustrated in Fig. 3.

With the parts constructed and assembled as described, the latch is normally yieldingly retained in its closed position by gravity and also by the action of the compression spring acting through the trigger and its gear connection with the latch. When a bail is to be placed in the hook socket the operator grasps the hook shank and the trigger handle, pressing the handle inwardly against the tension of the spring and carrying the trigger tooth 33 against the latch tooth, continued movement of the trigger rocking the latch into the housing chamber and exposing the socket. When the bail has been placed in the socket, the operator releases the handle and the latter is forced back to normal position by the spring. When the handle is released the latch drops automatically, but if it should stick, the trigger tooth 32 will engage the latch tooth and positively drive the latch to closed position. When the latch is closed as described, it is held closed by the trigger, any tendency of the latch to open being resisted by contact of the latch with the trigger tooth 33.

What I claim and desire to secure by Letters Patent is:

1. In a hook of the character described, a body portion and a bill spaced from the body portion to form a socket, a latch pivotally mounted on the body portion and adapted for projection across the socket to close the socket, and a trigger comprising a handle portion and an actuator for the latch, the actuator constituting a detent for holding the latch in functional position and a stop for limiting opening movement of the latch.

2. In a hook of the character described, a body portion and a bill spaced from the body portion to form a socket, a latch pivotally mounted on the body portion to swing across the socket, the hook having an inwardly facing seat and the latch a tooth engageable in said seat to transfer outward thrust from a bail from the latch to the hook, and a trigger comprising a handle portion and an actuator for the latch.

3. In a hook of the character described, a body portion and a bill spaced from the body portion to form a socket, a latch pivotally mounted on the body portion to close the socket and having a radial tooth, a trigger movably mounted on the body portion and having a tooth engageable with the latch tooth to actuate the latch and engageable by the latch to prevent unlocking movement of the latch.

4. In a hook of the character described, a body portion and a bill spaced from the body portion to form a socket, a latch pivotally mounted on the body portion to close the socket and having a radial tooth, a trigger movably mounted on the body portion and having a tooth engageable with the latch tooth to actuate the latch, and a spring normally urging the trigger to space the trigger tooth from the latch tooth.

5. In a hook of the character described, a body portion and a bill spaced from the body portion to form a socket, a latch pivotally mounted on the body portion to close the socket and having a radial tooth, a trigger movably mounted on the body portion and having a tooth engageable with the latch tooth to actuate the latch and engageable by the latch to prevent unlocking movement of the latch, and a spring normally urging the trigger to space the trigger back from the latch tooth and retain the trigger tooth in latch restraining position.

6. In a hook of the character described, a body portion and a bill spaced from the body portion to form a socket, a latch pivotally mounted on the body portion to close the socket and having a radial tooth, a trigger comprising a handle portion and an actuating portion, the actuating portion having teeth meshing with the latch tooth and spread to provide lost motion relative to the latch tooth, one of the actuator teeth engageable with the latch tooth to lift the latch.

7. In a hook of the character described, a body portion and a bill spaced from the body portion to form a socket, a latch pivotally mounted on the body portion to close the socket and having a radial tooth, a trigger comprising a handle portion and an actuating portion, the actuating portion having teeth meshing with the latch tooth and spread to provide lost motion relative to the latch tooth, one of the actuator teeth engageable with the latch tooth to lift the latch and the other actuator tooth being engageable with the latch tooth to close the latch.

8. In a hook of the character described, a body portion and a bill spaced from the body portion to form a socket, a latch pivotally mounted on the body portion to close the socket and having a radial tooth, a trigger comprising a handle portion and an actuating portion, the actuating portion having teeth meshing with the latch tooth and spread to provide lost motion relative to the latch tooth, one of the actuator teeth engageable with the latch tooth to lift the latch, said tooth and said latch having serrated portions adapted for engagement to stop lifting movement of the latch when the trigger is in normal position.

9. In a hook of the character described, a body portion and a bill spaced from the body portion to form a socket, a latch having a hub pivotally mounted on the body portion and having an eccentric head normally closing said socket, a tooth on said hub, a trigger pivotally mounted on said body portion comprising a handle portion and an actuating shank, the shank having a tooth engageable with the latch tooth to urge the latch to closed position and having a second tooth engageable with the latch tooth to open the latch, and a spring yieldingly urging the trigger to close the latch.

10. In a hook of the character described, a body portion and a bill spaced from the body portion to form a socket, a latch having a hub pivotally mounted on the body portion and having an eccentric head normally closing said socket, a tooth on said hub, a trigger pivotally mounted on said body portion comprising a handle portion and an actuating shank, the shank having a tooth engageable with the latch tooth to urge the latch to closed position and having a second tooth engageable with the latch tooth to open the latch, and a spring yieldingly urging the trigger to close the latch, the second trigger tooth serving as a detent to retain the latch in closed position.

11. In a hook of the character described, a body portion and a bill spaced from the body portion to form a socket, a latch having a hub pivotally mounted on the body portion and having an eccentric head normally closing said socket, a tooth on said hub, a trigger pivotally mounted on said body portion comprising a handle portion and an actuating shank, the shank having a tooth engageable with the latch tooth to urge the latch to closed position and having a second tooth engageable with the latch tooth to open the latch, and a spring yieldingly urging the trigger to close the latch, the second trigger tooth serving as a detent to retain the latch in closed position, the actuating shank comprising a stop portion for limiting opening travel of the latch.

12. In a hook of the character described, a body portion and a bill spaced from the body portion to form a socket, a latch having a hub pivotally mounted on the body portion and having an eccentric head normally closing said socket, a tooth on said hub, a trigger pivotally mounted on said body portion comprising a handle portion and an actuating shank, the shank having a tooth engageable with the latch tooth to urge the latch to closed position and having a second tooth engageable with the latch tooth to open the latch, and a spring yieldingly urging the trigger to close the latch, the second trigger tooth serving as a detent to retain the latch in closed position, the actuating shank comprising a stop portion for limiting opening travel of the latch, the body portion housing the latch and trigger and having openings through which the same are exposed for operation as set forth.

In testimony whereof I affix my signature.

ROBERT E. NEILSON.